Figure 1:
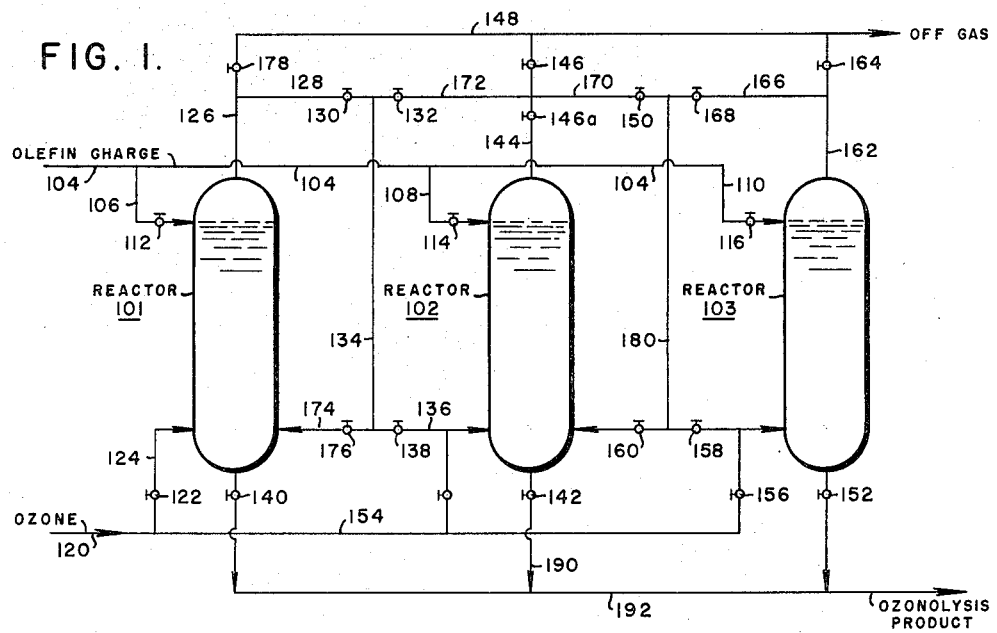

Aug. 18, 1964  J. T. HORECZY ETAL  3,145,217
USE OF A PARTIALLY OZONIZED HYDROCARBON LIQUID AS
AN ABSORBENT LIQUID IN THE OZONOLYSIS OF OLEFINS
Filed March 13, 1961

*INVENTORS.*
JOSEPH T. HORECZY,
ROBERT H. PERRY, JR.,
BY

*ATTORNEY.*

United States Patent Office 3,145,217
Patented Aug. 18, 1964

3,145,217
USE OF A PARTIALLY OZONIZED HYDROCARBON LIQUID AS AN ABSORBENT LIQUID IN THE OZONOLYSIS OF OLEFINS
Joseph T. Horeczy and Robert H. Perry, Jr., Baytown, Tex., assignors, by mesne assignments, to Esso Research and Engineering Company, Elizabeth, N.J., a corporation of Delaware
Filed Mar. 13, 1961, Ser. No. 95,341
6 Claims. (Cl. 260—339)

This application relates to the recovery of ozonolysis products from the off-gases resulting from the contact of an olefinic hydrocarbon with an ozone-bearing gas. In particular, the invention relates to the use of a partially ozonized hydrocarbon liquid as an absorbent liquid for recovering peroxidic ozonolysis products which are carried in the off-gas in the form of a fine suspension or fog.

The general process of ozonizing olefins, aliphatic or cyclic, has been well developed in the art, as set forth at length in Chemical Reviews, vol. 58, No. 5, October 1958, in the article by Philip S. Bailey, "The Reaction of Ozone With Organic Compounds." Representative olefin charge stocks include norbornylene, pentenes, hexenes, octenes, dimethyl butenes, styrene, dimethylcyclopentenes, butadiene, vinylcyclohexene, cyclohexene, tetramethyl cyclobutenes, etc.

During the initial portion of ozonolysis of these stocks a dense fog is generated which may be recovered by absorption in the partially ozonized hydrocarbon liquid as is more fully set forth hereinbelow. The ozonolysis process is generally as follows: The olefin is dissolved to ca. 1 to 40% (wt.) (usually 15 to 25%) in the solvent and fed to the reactor, which consists of a vessel into which is placed a gas inlet tube, or sprayer, and a stirring device. Or, the reactor may consist of a tubular system designed for efficient gas-liquid contact, in that liquid flows down through perforated plates and the ozone-containing gas is passed countercurrently and exits at the top of the reactor. An ozone-containing gas is passed into contact with the solution at a low temperature (e.g. −100° C. to about +30° C.) until the desired degree of ozonolysis is attained, suitably measured by the amount of ozone which has been absorbed. The ozone-containing gas may contain about 1 to 10% ozone, as is normally encountered in the effluent of commercial ozone generators. The ozonolysis product is recovered by evaporating the solvent, or may be further treated (e.g. oxidized) while in the original solvent. Pressure is not critical so long as the liquid phase is maintained. Atmospheric pressure, however, is preferred. The wide utility of the ozonolysis process, however, has been accompanied by several drawbacks, one of which occurs to some extent in virtually all olefinic ozonolysis reactions; namely, the loss of reaction products in the form of a noncondensable fog which is carried away in the off-gas from the ozonolysis reactor. It has been noted in the ozonolysis of the olefin hydrocarbons that during the initial period of the reaction (i.e., between initiation and about 75% of completion) the dense, white, non-condensable ozonidic fog is encountered in the gaseous stream leaving the reactor. The initially high rate of fog formation begins to decrease at about 25% of completion of the ozonolysis reaction and becomes nil at about 75% of completion. This fog is made up of peroxidic ozonolysis products and represents a valuable hydrocarbon product which, unless recovered, will be lost and discharged to the atmosphere. Besides being a valuable hydrocarbon product, these products which constitute this fog are toxic and may result in injury to workers or damage to plant life in the surrounding area if released to the atmosphere. Broadly, therefore, the present invention may be stated to reside in the ozonolysis of an olefinic hydrocarbon which produces an ozonidic fog during an initial portion of the ozonolysis, but does not produce the fog after the initial portion. Specifically, the invention consists in ozonizing the first portion of the olefinic hydrocarbon until the formation of the ozonidic fog no longer occurs (i.e., until the olefinic hydrocarbon is completely or preferably not quite completely ozonized), and using this first portion as the absorbent liquid to recover the fog which is generated in the ozonolysis of a second portion of the olefinic hydrocarbon.

By the practice of the present invention, this fog is removed by absorption in a special hydrocarbon fluid. This special fluid is made up of the partially ozonized olefinic hydrocarbon which is being treated and which forms the source of the fog involved. Since the hydrocarbon which has been reacted up to about 75% of completion is the source of the fog initially, the hydrocarbon in this state of reaction is unsuitable as an absorbent. This hydrocarbon is referred to hereinafter as "initially ozonized hydrocarbon." However, the hydrocarbon which has been reacted until the fog is no longer generated (i.e., a minimum of about 75% of completion) is an excellent absorbent and functions to remove entirely the peroxidic compounds from the off-gas. This hydrocarbon is referred to hereinafter as "partially ozonized hydrocarbon." The present invention further utilizes the off-gas stream from the initial ozonolysis to further the ozonolysis of the *absorbent* liquid, i.e. completing the ozonolysis thereof from 75% to 100%, providing an unexpected increase in efficiency in the over-all process. Where the absorbent has been ozonized to 100% of completion ("completely ozonized hydrocarbon") before contacting it with the fog-laden gas, of course, the increase in efficiency in the over-all process is not realized. For this reason the use of the partially ozonized olefinic hydrocarbon is preferred, although excellent fog recovery is obtainable by the use of the completely ozonized hydrocarbon as an absorbent. The absorption is effective at any temperature and pressure, so long as the partially ozonized olefinic hydrocarbon is in the liquid phase. Higher pressures and lower temperatures favor gaseous absorption; however, the most economical conditions are those prevalent in the ozonizing zone, since a minimum of heat loss and pumping energy is encountered under these conditions. The degree of ozonolysis is determined by withdrawal and analysis of samples and/or the amount of ozone absorbed by the reactant (i.e. the percent of the theoretical stoichiometric amount). The reaction is accordingly controlled to the desired degree of ozonolysis, with a minimum of about 75%.

Figure 2:
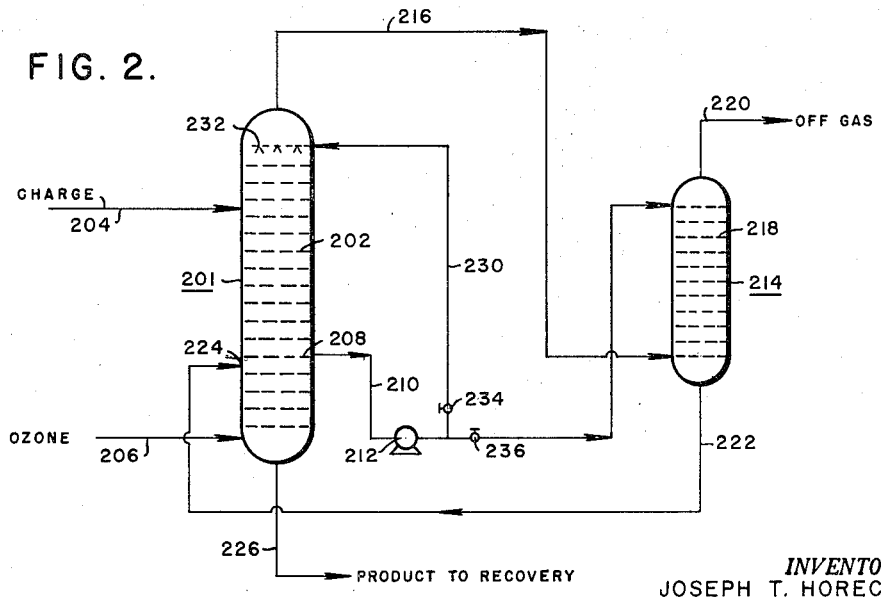

The invention may be more fully understood by a reference to the drawing wherein a preferred mode has been disclosed, and wherein:

FIG. 1 represents schematically the practice of the present invention in a batch ozonolysis reaction involving a primary reactor, a secondary reactor for absorbent purposes, and a swing reactor; and FIG. 2 which represents diagrammatically the practice of the present invention on a continuous scale.

In FIG. 1 the ozonolysis is carried fourth in a batch process involving the reactors 101, 102, and 103. The hydrocarbon charge is admitted into the three reactors by way of line 104, each reactor being filled to a predetermined level by way of lines 106, 108, and 110, after which the respective valves 112, 114, and 116 are closed. The ozonolysis is carried out in one only of the three reactors. For instance, an ozone-containing gas is admitted for contact with fresh hydrocarbon in the reactor 101. This is accomplished by way of line 120, valve 122, and line 124.

The off-gas from the reaction is vented from reactor 101 by way of line 126, line 128, and valve 130. Assuming that reactor 102 contains a partially ozonized hydrocarbon which has previously been ozonized to the extent of about 75% of completion, the valve 132 will be closed and the off-gas from reactor 101 will be admitted into the reactor 102 by way of line 134, line 136 and valve 138. The reactor 102 will then function as an after-scrubber for the recovery of the peroxidic fog from this off-gas stream. The valves 140 and 142, of course, remain closed during the entire sequence of operation to maintain the liquid within each of the respective reactors. The scrubbed off-gas is vented from reactor 102 by way of line 144 and valve 146 into the main vent line 148, from whence the off-gas is carried to a discharge into the atmosphere, or for suitable reuse by recharging with ozone. The valve 150, during this operation, obviously will remain closed. The reactor 103, during this operation, remains charged with fresh hydrocarbon which is retained within the reactor by closing valve 152. After the reaction in the vessel 101 has proceeded to 75% of completion, the valve 122 is closed, and an ozone-containing gas is then admitted by way of line 154 and valve 156 into reactor 103. Valves 158 and 160 remain closed. The off-gas, containing the ozonidic fog, is discharged by way of line 162, retained by closed valve 164 and passed by way of line 166 and open valves 168 and 150 into line 170. Valves 146 and 146a are closed to prevent passage into the reactor 102 and the fog-laden gas is transferred by way of line 172, valve 132, and line 134 into the charge line 174 controlled by valve 176 and admitted into reactor 101. The valve 130, of course, is blocked off to prevent the passage of the fog-laden gas into the upper reaches of the reactor 101. The fog-laden gas is bubbled upward through the partially ozonized hydrocarbon in reactor 101 and is discharged by way of line 126 and valve 178 into the common discharge line 148 as above-described. During the second portion of this operation, the completely ozonized hydrocarbon contained in reactor 102 is discharged by opening valve 142 and passing the ozonized product by way of line 190 and line 192 into the next stage of the reaction system, for instance, an oxidation step for the production of carboxylic acid. It should be noted that in the practice of this modification of the invention the final 25% of the ozonolysis is carried out by contact with the ozonidic fog-laden off-gases from the initial stage. If insufficient ozone remains in the off-gas from this stage to provide complete ozonolysis in the scrubber section, then it would be possible to complete the ozonolysis in reactor 101, for example, by passing ozone into the reactor through line 124 concurrently with the use of that reactor as an after-scrubber.

A second modification of the present invention might be carried out on a continuous scale by utilizing a countercurrent hydrocarbon-ozone-containing gas operation. For example, referring now to FIG. 2, a reaction zone comprising continuous column 201 is provided with liquid gas contacting means such as the plates 202, wherein the liquid olefinic hydrocarbon charge is introduced by way of line 204 and passed downwardly through the column 201 in contact with a rising stream of ozone-containing gas which is introduced by way of line 206. The partially ozonized olefinic hydrocarbon is withdrawn in a side stream, for instance, at plate 208 by means of line 210 and is pumped by means 212 to an after-scrubber 214, for example, to contact in countercurrent the off-gas which is vented from tower 201 by means of line 216. The countercurrent scrubbing is accomplished by means of internal packing or trays 218 within the after-scrubber 214. The off-gas from the after-scrubber is passed by way of line 220 to ultimate disposal or reuse, while the partially ozonized hydrocarbon scrubbing fluid is returned by way of line 222 for reintroduction into the ozonolysis tower 201 at a tray 224 which is located below the withdrawal tray 208. The completely ozonized product is withdrawn as a bottoms liquid through line 226 and taken to a further treating stage or to intermediate recovery. Alternatively, to the after-scrubber, described above, or concurrently therewith, a second stream of partially ozonized hydrocarbons may be passed by means of line 230 to a spray means in the upper reaches of the column 201 which is located above the feed trays 202. This spray means 232 contacts the rising gas (which contains the peroxidic fog) with the same partially ozonized hydrocarbon as is used in the after-scrubber 214. The relative proportioning of the streams between the spray 232 and the after-scrubber 214 are controlled by valves 234 and 236. It is to be understood that, if desired, only the spray within the upper portion of the tower may be used and the after-scrubber may be discarded entirely, or the after-scrubber 214 may be used while omitting entirely the spray means 232. In either event, by proper adjustment of the amount of recycle, it is possible to completely eliminate the peroxidic carry-over in the gaseous off stream, while maintaining substantially complete ozonolysis within the countercurrent contacting tower 201.

*Example I*

Three grams (0.032 mol) of norbornylene in 100 ml. of glacial acetic acid was ozonized at 8°±1° C. with ozone at a concentration of 1.06 mmol. of ozone per liter of gas in a tubular ozonolysis reactor. A very dense fog was formed throughout a system of cold-traps. The fog appeared to be somewhat peroxidic since during these early stages of the ozonolysis, the potassium iodide trap at the end of the train turned to a yellow color. When 19.5 l. of gas had been passed through the solution, fogging had essentially stopped, and treatment with ozone was discontinued. This product solution was removed from the reactor and charged to a bubbler-type trap contained in a cooling bath maintained at 0° C. A new ozonolysis reaction was started using a fresh batch (3.0 grams) of norbornylene in 100 ml. of acetic acid using the same conditions as those employed in the first step. The exit gas and "fog" were passed through the "peroxide bubbler" and into a potassium iodide trap. As determined visually, all of the fog was condensed or absorbed by the peroxide bubbler, and the exit gas potassium iodide trap did not change color until the latter stages of the ozonolysis reaction indicating that fog had not reached the potassium iodide trap during the fogging stage. A total volume of gas added in the second ozonolysis period was 21.1 at which point fogging had stopped. When butadiene, pentenes, hexenes, octenes, norbornylene, dimethyl butenes, vinylcyclohexene, cyclohexene, dimethyl cyclopentenes, styrene, tetramethyl cyclohexenes, etc. are treated under the above conditions, a fog is generated which may be advantageously recovered by the process of the present invention, as set out hereinabove.

The absorption step treated in the example above may be accomplished at temperatures within the range of about 0° C. to about 40° C., and the space velocity may range from 1 volume of off-gas per volume of absorbent liquid per hour to about 10 vols./vol. hr.

We have disclosed a preferred mode of practicing our invention, in two alternative manners, and have further set forth data which gives specific operating conditions under which the present invention may be used. The scope of the present invention should not be limited by the example given nor by the modes of operation set forth in the specification, but only by the appended claims.

We claim:

1. In the ozonolysis of an olefinic hydrocarbon by contacting said olefinic hydrocarbon in the liquid phase with an ozone-containing gas, wherein an ozonidic fog is generated during the ozonolysis of up to about 75% of the hydrocarbon, the improvement of recovering said fog by contact with olefinic hydrocarbon which has been ozonized until said ozonidic fog no longer occurs.

2. A method in accordance with claim 1 wherein said olefinic hydrocarbon has been ozonized more than about 75% of completion before contact with said fog.

3. In the ozonolysis of norbornylene by liquid phase contact with an ozone-containing gas, wherein a noncondensable fog is generated during the ozonolysis of norbornylene up to about 75% of completion, the improvement of recovering said fog by contact with norbornylene which has been ozonized more than about 75% of completion.

4. In the ozonolysis of an olefinic hydrocarbon by contacting said olefinic hydrocarbon in a reaction zone in the liquid phase with an ozone-containing gas, wherein an ozonidic fog is generated and carried from said reaction zone in an off-gas stream during an initial portion of said ozonolysis, but is not generated after said initial portion, the improvement of ozonizing the first portion of said olefinic hydrocarbon until the formation of said ozonidic fog no longer occurs but said olefin is not completely ozonized, to obtain a partially ozonized first portion of said olefinic hydrocarbon, passing an ozone-containing gas into contact with a second portion of said olefinic hydrocarbon whereby said ozonidic fog is generated and is carried from the reaction zone by said off-gas, and contacting said off-gas with said partially ozonized first portion of said olefinic hydrocarbon whereby said ozonidic fog is absorbed by said first portion and said first portion is further ozonied.

5. In the ozonolysis of an olefinic hydrocarbon by contacting said olefinic hydrocarbon in a reaction zone in the liquid phase with an ozone-containing gas, wherein an ozonidic fog is generated and carried from said reaction zone in an off-gas stream during an initial portion of said ozonolysis, but is not generated after said initial portion, the improvement of passing said olefinic hydrocarbon in countercurrent contact with said ozone-containing gas in said reaction zone, withdrawing a partially ozonized first portion of said olefinic hydrocarbon from a point in said reaction zone where no ozonidic fog is being generated, withdrawing said off-gas from said reaction zone, contacting said off-gas outside said reaction zone with said partially ozonized first portion whereby the ozonidic fog is absorbed by said partially ozonized first portion, separating said off-gas and said partially ozonized first portion, and recycling said partially ozonized first portion to said reaction zone.

6. A method in accordance with claim 5 wherein the recycled partially ozonized olefin is introduced into the ozonizing zone at a point subsequent to the partially ozonized olefin withdrawal.

References Cited in the file of this patent
UNITED STATES PATENTS

| | | |
|---|---|---|
| 1,689,599 | Ramage | Oct. 30, 1928 |
| 2,857,410 | Thorp et al. | Oct. 21, 1958 |
| 2,963,487 | Perry | Dec. 6, 1960 |